(12) United States Patent
Höfken et al.

(10) Patent No.: US 11,484,848 B2
(45) Date of Patent: Nov. 1, 2022

(54) APPARATUS FOR AERATING BODIES OF WATER

(71) Applicant: INVENT Umwelt- und Verfahrenstechnik AG, Erlangen (DE)

(72) Inventors: Marcus Höfken, Erlangen (DE); Thomas Hagspiel, Postbauer-Heng (DE); Torsten Frey, Nuremberg (DE); Walter Steidl, Burgthann (DE)

(73) Assignee: INVENT Umwelt—und Verfahrenstechnik AG, Erlangen (DE)

( * ) Notice: Subject to any disclaimer, the term of this patent is extended or adjusted under 35 U.S.C. 154(b) by 0 days.

(21) Appl. No.: 17/271,723

(22) PCT Filed: Nov. 29, 2019

(86) PCT No.: PCT/EP2019/083097
§ 371 (c)(1),
(2) Date: Feb. 26, 2021

(87) PCT Pub. No.: WO2020/114908
PCT Pub. Date: Jun. 11, 2020

(65) Prior Publication Data
US 2021/0316257 A1   Oct. 14, 2021

(30) Foreign Application Priority Data

Dec. 3, 2018  (DE) .......................... 202018106871.7
Feb. 11, 2019 (DE) .......................... 102019103252.0

(51) Int. Cl.
*B01F 7/16* (2006.01)
*B01F 23/233* (2022.01)
(Continued)

(52) U.S. Cl.
CPC ...... *B01F 23/2331* (2022.01); *B01F 23/2333* (2022.01); *B01F 27/117* (2022.01);
(Continued)

(58) Field of Classification Search
CPC .......... B01F 23/23311; B01F 23/23314; B01F 23/23365; B01F 33/503; B01F 23/2331;
(Continued)

(56) References Cited

U.S. PATENT DOCUMENTS 1,526,596 A * 2/1925 Greenawalt ......... B01F 23/2331
261/87
1,726,125 A * 8/1929 Thomas .................. B01F 27/81
261/87
(Continued)

FOREIGN PATENT DOCUMENTS

CN    102491545 A   6/2012
DE      8016582 U1   2/1981
(Continued)

OTHER PUBLICATIONS

Posten, Katharina; International Search Report; PCT/EP2019/083097; dated Mar. 9, 2020; 5 pages.

*Primary Examiner* — Charles S Bushey
(74) *Attorney, Agent, or Firm* — Shackelford, Bowen, McKinley & Norton, LLP

(57) ABSTRACT

An apparatus for aerating bodies of water includes a floating platform, a motor supported by the floating platform, a transmission which is coupled to the motor and whose output shaft is in the form of a hollow shaft, a fan for supplying air through an air supply line connected thereto, wherein the air supply line is connected to one end of the hollow shaft, a hollow stirring shaft coupled to the other end of the hollow shaft, an stirrer affixed to the free end of the approximately vertical stirring shaft, wherein the stirrer is designated as a hollow body and has a central opening through which air supplied by the stirring shaft can pass, and a multiplicity of air outlet openings.

19 Claims, 8 Drawing Sheets

Figure 1:
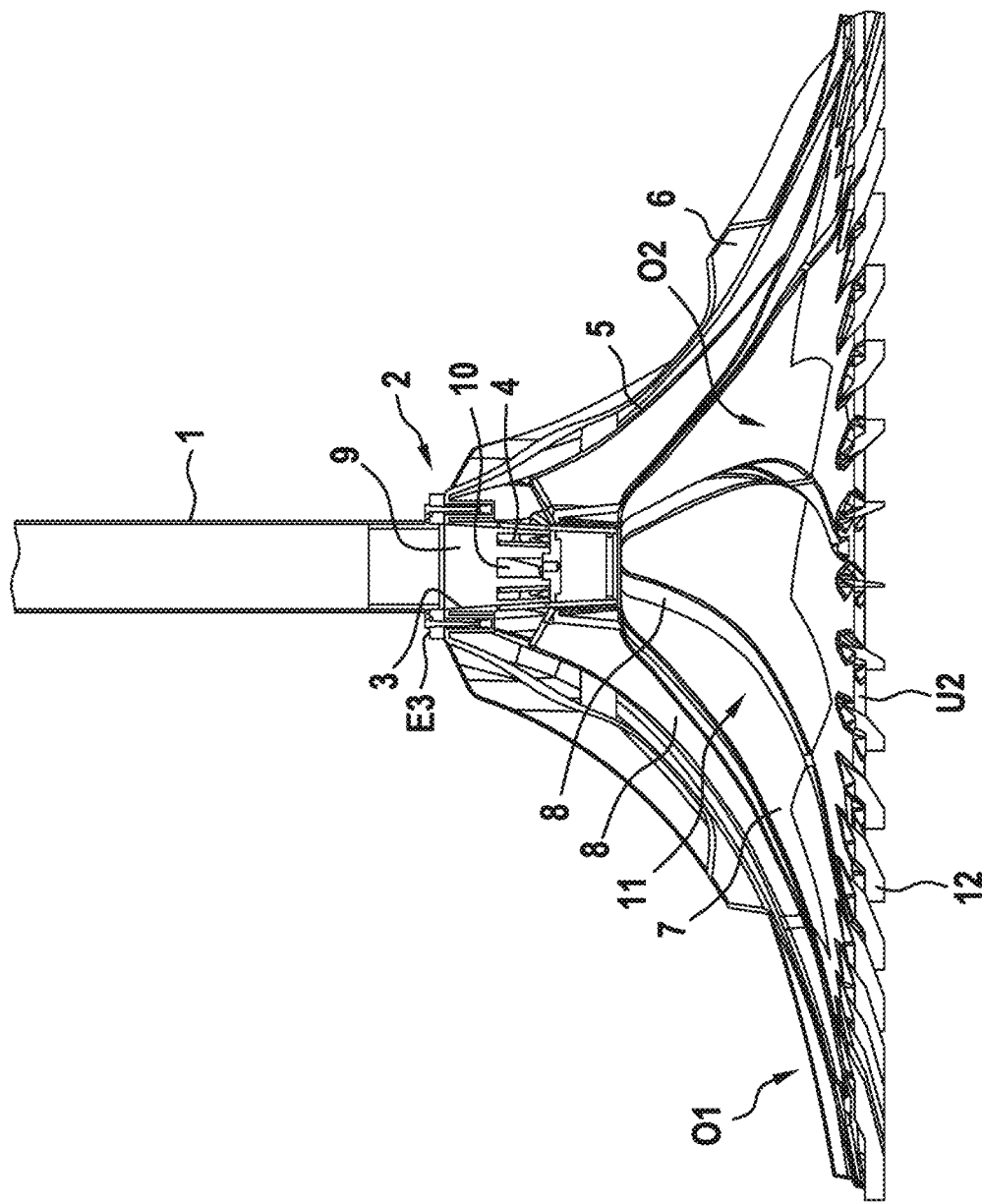

(51) Int. Cl.
  *C02F 7/00* (2006.01)
  *B01F 27/117* (2022.01)
  *B01F 27/94* (2022.01)
  *B01F 33/503* (2022.01)
  *B01F 33/50* (2022.01)
  *B01F 101/00* (2022.01)

(52) U.S. Cl.
  CPC ............ *B01F 27/941* (2022.01); *B01F 33/50* (2022.01); *B01F 33/503* (2022.01); *C02F 7/00* (2013.01); *B01F 23/23311* (2022.01); *B01F 23/23314* (2022.01); *B01F 23/23365* (2022.01); *B01F 2101/305* (2022.01)

(58) Field of Classification Search
  CPC .. B01F 23/2333; B01F 27/117; B01F 27/941; B01F 33/50; B01F 2101/305; C02F 7/00
  USPC .................................................... 261/87, 120
  See application file for complete search history.

(56) References Cited

U.S. PATENT DOCUMENTS

| | | | | |
|---|---|---|---|---|
| 3,630,498 A | * | 12/1971 | Bielinski | B01F 23/23342 210/219 |
| 3,744,765 A | * | 7/1973 | Bard | B01F 23/2331 261/87 |
| 3,782,702 A | * | 1/1974 | King | B01F 23/2368 261/87 |
| 7,431,272 B2 | * | 10/2008 | Melen | B01F 23/23342 261/87 |
| 7,661,659 B2 | * | 2/2010 | Sun | C02F 3/203 261/87 |
| 7,784,769 B2 | * | 8/2010 | Hoefken | B01F 27/1171 210/150 |
| 7,997,788 B2 | * | 8/2011 | Bell | B63H 1/265 261/87 |
| 2004/0217493 A1 | | 11/2004 | Sperber et al. | |
| 2016/0279583 A1 | * | 9/2016 | Jeong | B01F 23/2331 |
| 2016/0310914 A1 | | 10/2016 | Tsuei | |
| 2021/0394132 A1 | * | 12/2021 | Höfken | B01F 23/2331 |

FOREIGN PATENT DOCUMENTS

| | | |
|---|---|---|
| DE | 3209283 A1 | 9/1983 |
| DE | 19823839 A1 | 12/1999 |
| DE | 19826098 C2 | 3/2002 |
| DE | 20207376 U1 | 6/2003 |
| EP | 0365013 A2 | 4/1990 |
| KR | 200447286 Y1 | 1/2010 |
| WO | WO 2015064904 A1 * | 5/2015 |
| WO | WO-2020114907 A1 | 6/2020 |

* cited by examiner

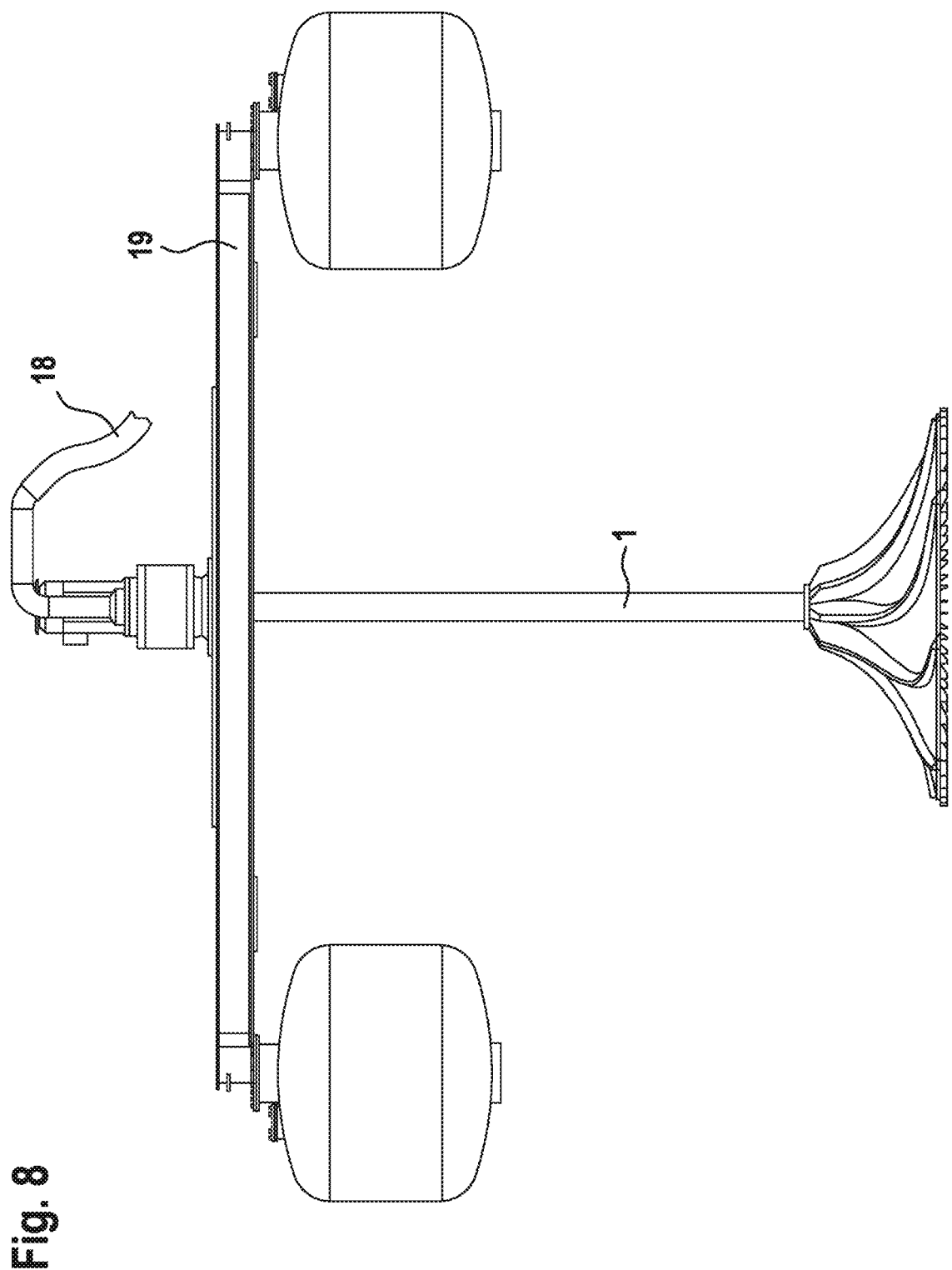

APPARATUS FOR AERATING BODIES OF WATER

The invention relates to a device for aerating bodies of water, in particular stationary or flowing bodies of water, for example lakes, ponds, rivers or the like.

According to the prior art it is known to aerate bodies of water for example using rotary systems or jet systems. Aeration systems of this kind usually cause an enrichment of oxygen only in the area close to the surface.

Other aeration systems known from the prior art, for example tube or candle aerators or disc diffusers, involve a high tubing and installation effort on account of their limited dimensions. In addition, it is also known to aerate bodies of water by means of membranous tubes. In order to hold such membranous tubes, special devices are necessary, which are unsuitable in particular in natural bodies of water.

The object of the invention is to overcome the disadvantages according to the prior art. In particular, a device for aerating bodies of water that can be installed as easily as possible shall be described. In accordance with a further objective of the invention, a particularly efficient aeration of bodies of water shall be achieved. Expedient embodiments of the invention will become clear from the features of the dependent claims.

In accordance with the invention a device for aerating bodies of water is proposed, comprising a floating platform, a motor supported on the floating platform, a transmission coupled to the motor, the output shaft of the transmission being formed as a hollow shaft, a fan for feeding air through an air feed line connected to the fan, wherein the air feed line is connected to one end of the hollow shaft, a hollow agitator shaft coupled to the other end of the hollow shaft, an agitator body attached to the free end of the approximately vertically extending agitator shaft, wherein the agitator body is formed as a hollow body and has a central aperture for the passage of air fed through the agitator shaft and has a plurality of air outlet openings.

The proposed device can be installed quickly and easily. To this end it is merely necessary to place the floating platform in the body of water to be aerated and to anchor it there suitably. The motor together with the transmission, hollow shaft and agitator body may already be pre-assembled. Of course, it may also be that the agitator shaft together with the agitator body forms a separate assembly unit, which is mounted on the hollow shaft only once the floating platform has been placed on the water.

With the proposed device it is possible to feed 80 to 150 kg of oxygen per hour to a body of water. The proposed device thus enables a particularly efficient aeration in particular of natural bodies of water.

In accordance with an advantageous embodiment, the fan is received on the floating platform. In this case it is not necessary to lay an air feed line from a fan located on land to the floating platform. The installation of the device is thus simplified.

In accordance with a further advantageous embodiment, the motor and the transmission, jointly with the fan and the feed line, are preferably surrounded by a housing. The housing protects the motor and/or fan against weathering influences. In addition, the housing advantageously has a sound-damping effect, and therefore the proposed device is also usable in densely populated areas.

In accordance with a particularly advantageous embodiment the agitator body is a hyperboloid agitator body, wherein the air outlet openings are provided at a peripheral edge of the hyperboloid agitator body. A hyperboloid agitator body advantageously on the one hand brings about a rotary flow, which rotates about the vertical agitator shaft. In addition, the hyperboloid agitator body brings about a circulating flow, which is directed from the surface of the body of water to be aerated in the axial direction along the agitator shaft towards the agitator body, then bends in the radial direction, and then rises again in the vertical direction to the surface of the body of water. This enables a particularly intense and efficient aeration of the body of water. The use of a hyperboloid agitator body results here in a relatively low energy consumption.

In accordance with an advantageous embodiment the air distribution device, downstream of the aperture, has an air distribution space with a plurality of air distribution apertures. Each air distribution aperture advantageously opens out into an air channel, which is delimited by walls running radially in sections. The walls running radially in sections bend expediently towards the peripheral edge of the hyperboloid agitator body in a tangential direction. The air outlet openings are expediently each provided at radially outer end portions of the air channels. The proposed design of the hyperboloid agitator body, in particular the air distribution device, utilises the geometry of the hyperboloid agitator body as far as possible. A compact construction results for the design of the hollow body. The provision of the air outlet openings at the radially outer end portions of the air channels contributes to a particularly effective gassing of the body of water.

In accordance with a particularly advantageous embodiment the hyperboloid agitator body is formed from an upper shell containing the connection portion and a lower shell connected to the upper shell, wherein the air channels are delimited by the upper shell and the lower shell. Consequently, the air channels may be produced by simply joining together the upper shell and the lower shell.

Transport ribs running radially in sections expediently extend from the first upper side of the upper shell. The transport ribs may bend—similarly to the walls—towards the peripheral edge of the hyperboloid agitator body in a tangential direction. The walls expediently extend from a second upper side of the lower shell. In accordance with a particularly advantageous embodiment, the course of the walls corresponds to the course of the transport ribs, such that, when the upper and lower shells are joined, each transport rib underside is supported on an upper edge of one of the walls. This thus results in a particularly stable and torsion-resistant construction. Furthermore, the air channels may thus be produced in a simple way by joining the upper shell to the lower shell. The walls may also have openings or may be formed from a number of portions, with gaps situated in-between.

In accordance with a further advantageous embodiment the second upper side of the lower shell is formed in concave, preferably hyperboloid-like fashion. Both the upper side and the underside may be formed in hyperboloid-like fashion. A particularly compact and stable hollow body is provided when the upper shell is joined to the lower shell.

The air outlet openings are expediently provided in the vicinity of a peripheral edge of the hollow body. In particular, the air outlet openings may be provided in the vicinity of a peripheral edge of the lower shell, in particular on a second underside of the lower shell opposite the second upper side. Shearing ribs extending radially outwardly are advantageously attached to the second underside.

At least one of the air outlet openings is expediently provided between 2 shearing ribs. Due to the proposed arrangement, air bubbles exiting through the air outlet openings are destroyed immediately by the effect of the shearing ribs and/or are distributed finely in the surrounding liquid. A particularly efficient gassing of the body of water is thus achieved.

The upper and the lower shells may each be produced from fibre-reinforced plastic. In accordance with an expedient embodiment the air distribution space is formed from a rotationally symmetrical, preferably conical insert, with the air distribution apertures provided in the peripheral wall of said insert. The insert may also be produced from fibre-reinforced plastic. Consequently, the hollow body may be produced easily from few parts, specifically the upper shell, the lower shell and the insert, for example by gluing.

Figure 2:
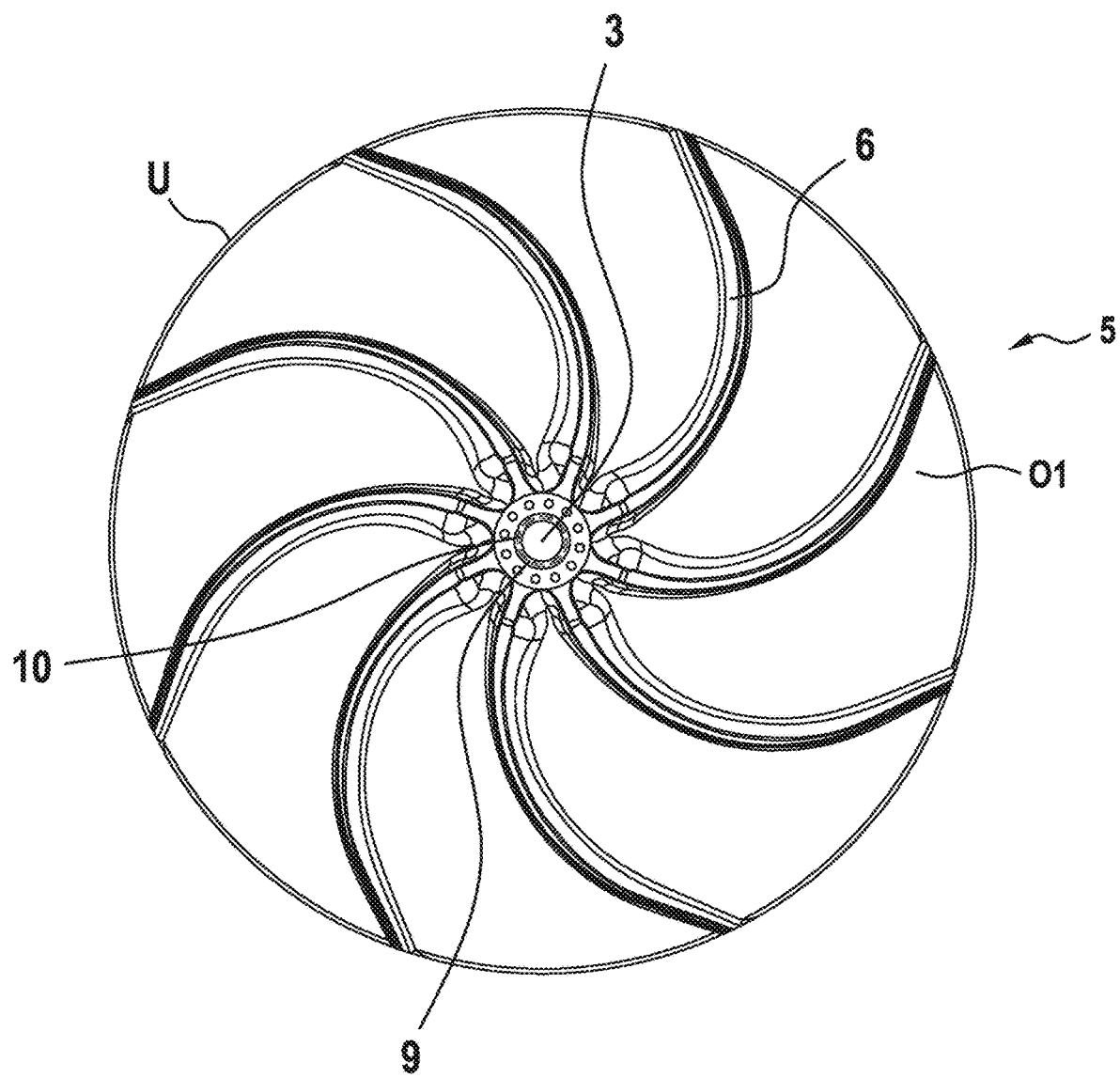
Figure 3:
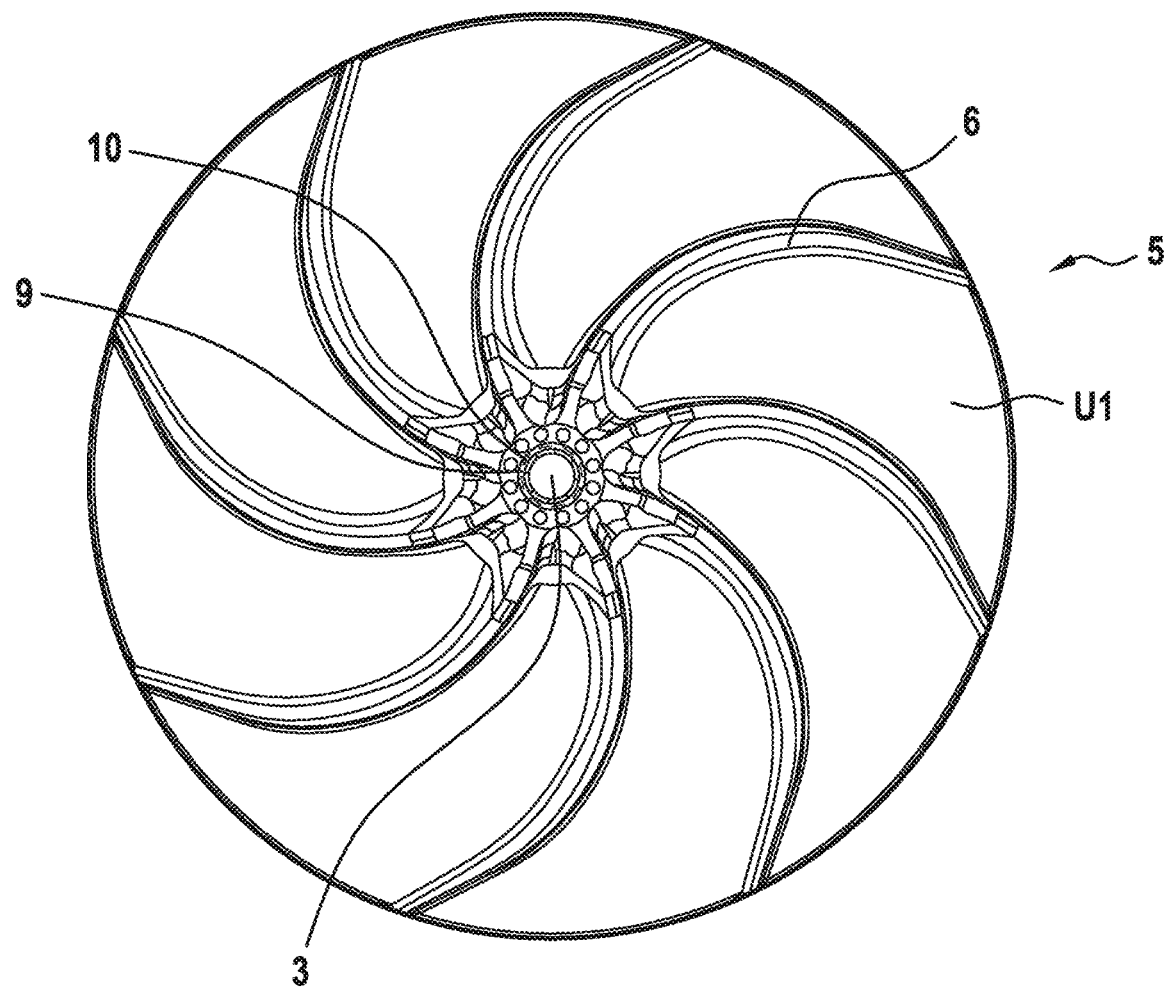
Figure 4:
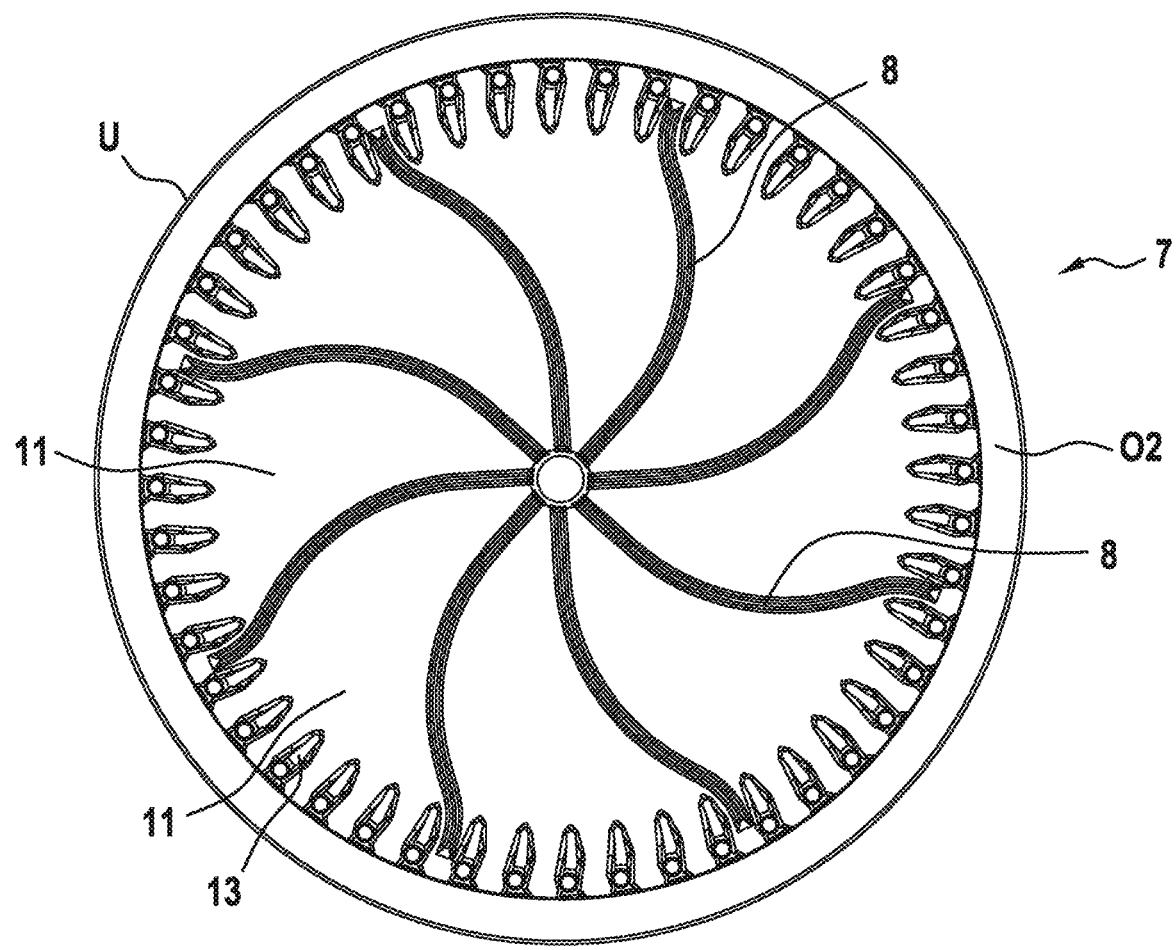
Figure 5:
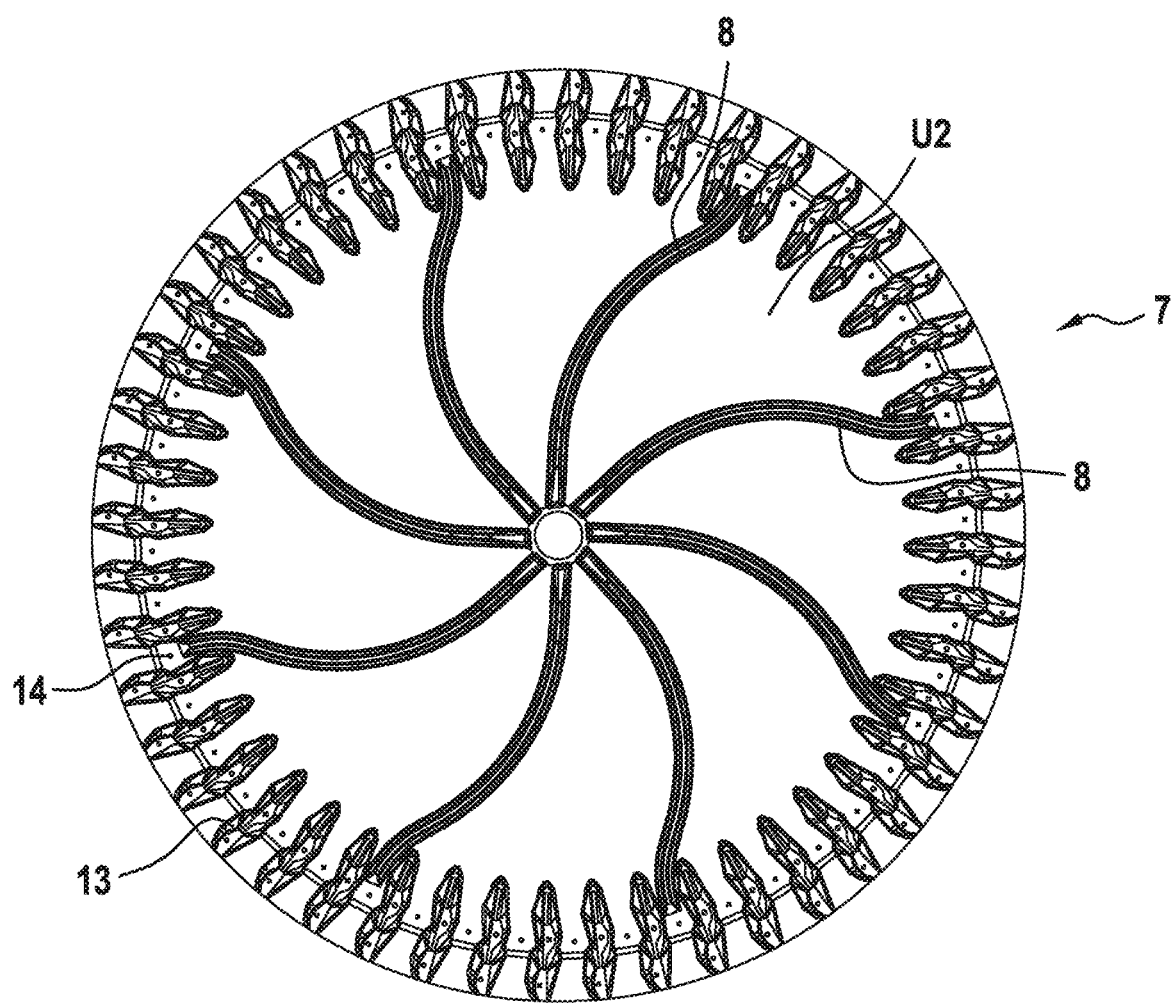
Figure 6:
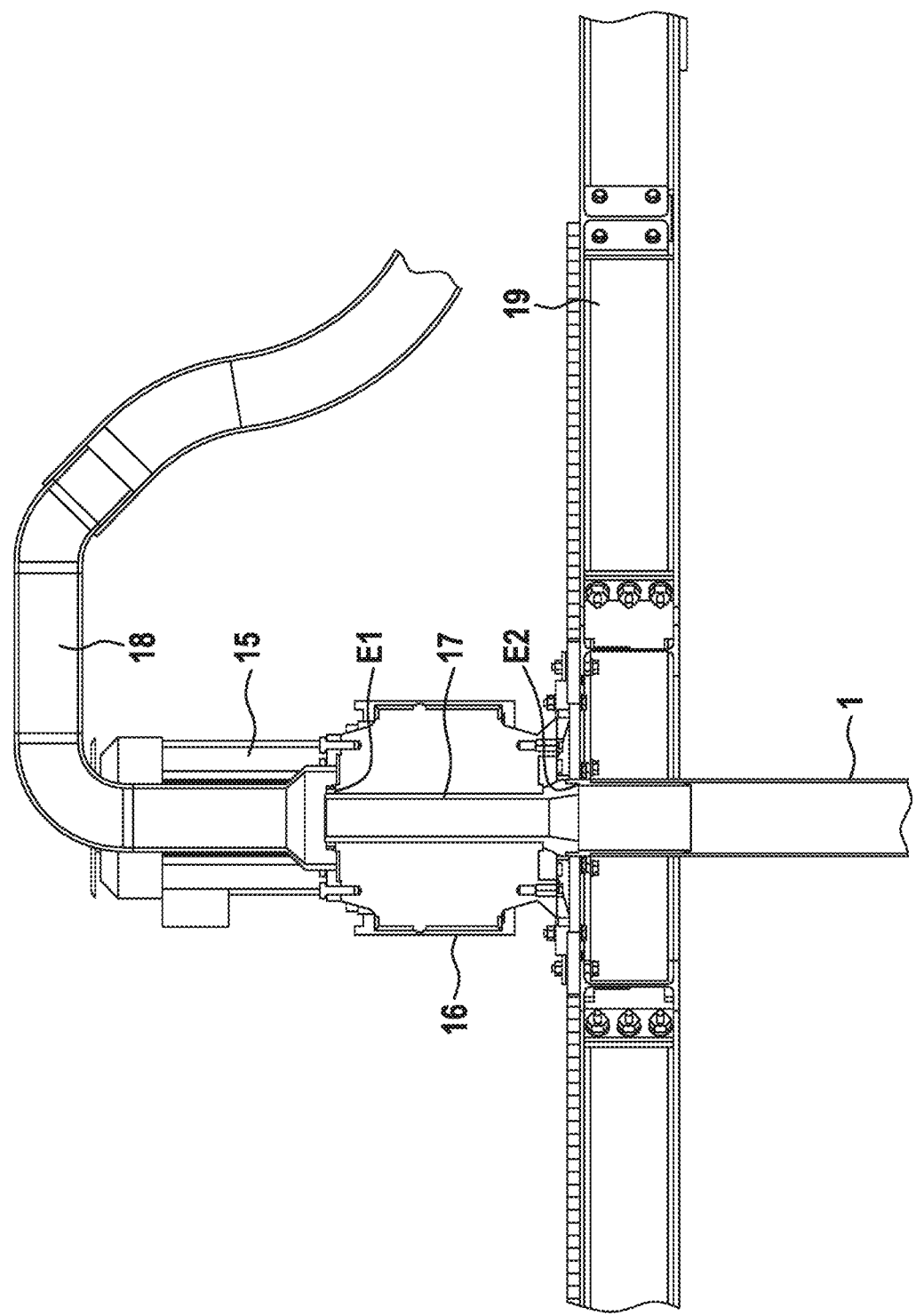
Figure 7:
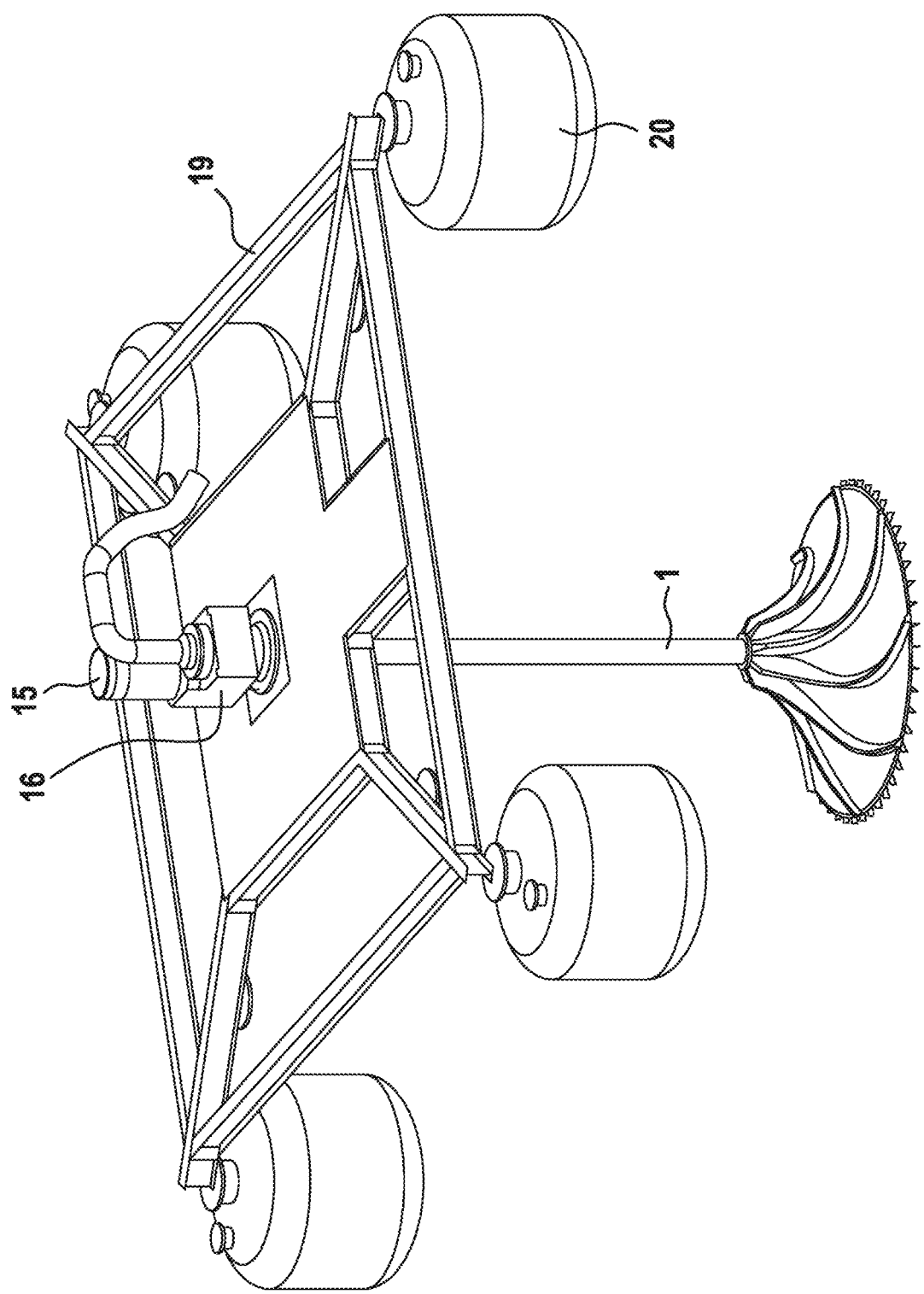

Exemplary embodiments of the invention will be explained in greater detail hereinafter with reference to the drawing, in which:

FIG. 1 shows a partially broken-open perspective view of a hyperboloid agitator body, FIG. 2 show a plan view of an upper shell, FIG. 3 shows a view from below according to FIG. 2, FIG. 4 shows a plan view of a lower shell, FIG. 5 shows a view from below according to FIG. 4, FIG. 6 shows a schematic sectional view through a transmission, FIG. 7 shows a perspective view of a device for aerating bodies of water, and FIG. 8 shows a side view according to FIG. 7.

In FIG. 1 a hyperboloid agitator body is attached to a hollow agitator shaft 1. The hyperboloid agitator body has a central connection portion denoted by reference sign 2. The connection portion 2 has a central aperture 3 for the passage of air.

Reference sign 5 denotes an upper shell, with transport ribs 6 extending from the first upper side O1 of the upper shell. Reference sign 7 denotes a lower shell, with walls 8 extending from the second upper side O2 of the lower shell. Reference sign 9 denotes an insert which is provided downstream of the aperture 3 and forms an air distribution space 4. The insert 9 is formed in the manner of a conical beaker and has a plurality of air distribution apertures 10 on its peripheral wall. Each of the air distribution apertures 10 opens out into an air channel 11 formed by adjacent walls 8 as well as the upper shell 5 and the lower shell 7. Shearing ribs 12 are attached to a second underside U2 of the lower shell 7 at the peripheral edge thereof.

FIG. 2 shows a plan view of the first upper side O1 of the upper shell. The transport ribs 6 extending from the first upper side O1 can be seen and run from the aperture 3 firstly in a radial direction and then bend towards the peripheral edge U in a tangential direction. The insert 9 arranged downstream of the aperture 3 and having the air distribution apertures 10 is also visible.

FIG. 3 shows a lower view according to FIG. 2. The transport ribs 6 in the form of indentations are visible on a first underside U1 of the upper shell 5.

FIG. 4 shows a plan view of the second upper side O2 of the lower shell 7. The lower shell 7 is closed at its centre, i.e, opposite the aperture 3 provided in the upper shell 5. The walls 8 extend from the second upper side O2. The walls 8—similarly to the transport ribs 6—run from the centre firstly in a radial direction and then bend towards the peripheral edge U in a substantially tangential direction. A plurality of holding devices 13, which form indentations in the second upper side O2, are situated at the peripheral edge U. The holding devices 13 are used—as can be seen in particular from FIG. 5 explained hereinafter—to receive and fasten the shearing ribs 12.

FIG. 5 shows a view from below according to FIG. 4. On a second underside U2 of the lower shell, the walls 8 in the form of indentations are visible. The holding devices 13 by contrast extend from the second underside U2. Reference is also made in this regard to FIG. 1. An air outlet opening 14 is provided between each two adjacent holding devices 13 or each two adjacent shearing ribs 12.

FIG. 6 shows a schematic sectional view through a transmission 16, which is connected drivingly to a motor 15. The transmission 16 has a transmission hollow shaft 17, the first end of which is connected to an air feed line 18. A fan connected to the air feed line 18 is not shown here. A second end E2 of the transmission hollow shaft 17 is connected to the hollow agitator shaft 1. As can be seen from FIG. 1, a third end E3 of the hollow agitator shaft 1 is connected to the hyperboloid agitator body shown in FIGS. 1 to 5.

The agitator and gassing device discernible in particular from FIGS. 1 and 6 may be attached for example to a raft 19 (see FIG. 6). A body of water, for example a pond, lake or the like, may thus be efficiently circulated and gassed.

Floating bodies which are held at the four corners of a substantially rectangular frame are denoted in FIGS. 7 and 8 by the reference sign 20. The frame, together with the floating body 20, forms the raft.

Although the agitator body has been described above in the form of a hyperboloid agitator body, it may of course also be possible in accordance with the subject matter of the invention that the agitator body is embodied differently. The agitator body, however, is advantageously formed rotationally symmetrically. It may also be formed in the manner of a cone or frustum of a cone.

The invention claimed is:

1. A device for aerating bodies of water, comprising
a floating platform;
a motor supported on the floating platform;
a transmission coupled to the motor, an output shaft of the transmission being formed as a hollow shaft;
a fan for feeding air through an air feed line connected to the fan, wherein the air feed line is connected to one end of the hollow shaft;
a hollow agitator shaft coupled to the other end of the hollow shaft;
an agitator body attached to the free end of the hollow agitator shaft;
wherein the agitator body is formed as a hollow body and has a central aperture for the passage of air fed through the hollow agitator shaft and has a plurality of air outlet openings;
wherein the air outlet openings are each provided at radially outer end portions of air channels;
wherein the device is formed from an upper shell containing a connection portion and a lower shell connected to the upper shell, wherein the air channels are delimited by the upper shell and the lower shell; and
wherein an air distribution device for distributing air guided through the central aperture towards the air outlet openings is provided downstream of the central aperture.

2. The device according to claim 1, wherein the fan is received on the floating platform.

3. The device according to claim 1, wherein the motor and the transmission are surrounded by a housing.

4. The device according to claim 1, wherein the agitator body is a hyperboloid agitator body and the air outlet openings are provided on a peripheral edge of the hyperboloid agitator body.

5. The device according to claim 1, wherein an air distribution device, downstream of the central aperture, has an air distribution space with a plurality of air distribution apertures.

6. The device according to claim 5, wherein the air distribution space is formed from a rotationally symmetrical insert, with the air distribution apertures provided in the peripheral wall of the rotationally symmetrical insert.

7. The device according to claim 6, wherein the rotationally symmetrical insert is produced from fiber-reinforced plastic.

8. The device according to claim 1, wherein each of a plurality of air distribution apertures opens out into an air channel that is delimited by walls extending radially in sections.

9. The device according to claim 8, wherein the walls extend from a second upper side of the lower shell.

10. The device according to claim 9, wherein a course of the walls corresponds to a course of transport ribs, such that, when the upper and lower shells are joined, each transport rib underside is supported on an upper edge of the walls.

11. The device according to claim 9, wherein the second upper side of the lower shell is formed in concave fashion.

12. The device according to claim 9, wherein radially outwardly extending shearing ribs are attached to a second underside of the lower shell opposite the second upper side.

13. The device according to claim 1, wherein transport ribs running radially in sections extend from a first upper side of the upper shell.

14. The device according to claim 1, wherein the air outlet openings are provided in the vicinity of a peripheral edge of the lower shell.

15. The device according to claim 1, wherein one of the air outlet openings is provided between each of two shearing ribs.

16. The device according to claim 1, wherein the upper shell and the lower shell are each produced from fibre-reinforced plastic.

17. The device according to claim 3, wherein the motor and the transmission are surrounded by the housing jointly with the fan and the air feed line.

18. A device for aerating bodies of water, comprising
a floating platform;
a motor supported on the floating platform;
a transmission coupled to the motor, an output shaft of the transmission being formed as a hollow shaft;
a fan for feeding air through an air feed line connected to the fan, wherein the air feed line is connected to one end of the hollow shaft;
a hollow agitator shaft coupled to the other end of the hollow shaft;
an agitator body attached to the free end of hollow agitator shaft;
wherein the agitator body is formed as a hollow body and has a central aperture for the passage of air fed through the hollow agitator shaft and has a plurality of air outlet openings;
wherein the air outlet openings are each provided at radially outer end portions of air channels;
wherein the device is formed from an upper shell containing a connection portion and a lower shell connected to the upper shell, wherein the air channels are delimited by the upper shell and the lower shell; and
wherein an air distribution device, downstream of the central aperture, has an air distribution space with a plurality of air distribution apertures.

19. A device for aerating bodies of water, comprising
a floating platform;
a motor supported on the floating platform;
a transmission coupled to the motor, an output shaft of the transmission being formed as a hollow shaft;
a fan for feeding air through an air feed line connected to the fan, wherein the air feed line is connected to one end of the hollow shaft;
a hollow agitator shaft coupled to the other end of the hollow shaft;
an agitator body attached to the free end of hollow agitator shaft;
wherein the agitator body is formed as a hollow body and has a central aperture for the passage of air fed through the hollow agitator shaft and has a plurality of air outlet openings;
wherein the air outlet openings are each provided at radially outer end portions of air channels;
wherein the device is formed from an upper shell containing a connection portion and a lower shell connected to the upper shell, wherein the air channels are delimited by the upper shell and the lower shell; and
wherein each of a plurality of air distribution apertures opens out into an air channel that is delimited by walls extending radially in sections.

* * * * *